US010149136B1

(12) United States Patent
Sathya et al.

(10) Patent No.: US 10,149,136 B1
(45) Date of Patent: Dec. 4, 2018

(54) PROXIMITY-BASED TRUST

(71) Applicant: Facebook, Inc., Menlo Park, CA (US)

(72) Inventors: Sai Sri Sathya, Tamil Nadu (IN);
Ramesh Raskar, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/866,777

(22) Filed: Jan. 10, 2018

(51) Int. Cl.
| H04B 7/00 | (2006.01) |
| H04Q 7/20 | (2006.01) |
| H04W 4/80 | (2018.01) |
| H04W 4/38 | (2018.01) |
| G06F 15/18 | (2006.01) |
| H04L 9/08 | (2006.01) |
| G06Q 50/00 | (2012.01) |

(52) U.S. Cl.
CPC ............ *H04W 4/80* (2018.02); *G06F 15/18* (2013.01); *H04L 9/0816* (2013.01); *H04W 4/38* (2018.02); *G06Q 50/01* (2013.01)

(58) Field of Classification Search
CPC ........... H04W 4/80; H04W 4/38; G06F 15/18; H04L 9/0816; G06Q 50/01
See application file for complete search history.

(56) References Cited

U.S. PATENT DOCUMENTS

| 8,726,344 | B1 | 5/2014 | Amidon | |
| 2011/0035789 | A1 | 2/2011 | Callahan | |
| 2013/0239206 | A1 | 9/2013 | Draluk | |
| 2015/0089568 | A1 | 3/2015 | Sprague | |
| 2015/0373007 | A1 | 12/2015 | Sheller | |
| 2016/0182435 | A1* | 6/2016 | Landqvist | H04L 51/32 |
| | | | | 709/204 |
| 2017/0034333 | A1* | 2/2017 | Vishwanath | H04M 1/72527 |

OTHER PUBLICATIONS

International Search Report and Written Opinion for International Application PCT/US2018/013841. dated Oct. 10, 2018.

* cited by examiner

*Primary Examiner* — Nguyen Vo
(74) *Attorney, Agent, or Firm* — Baker Botts L.L.P.

(57) ABSTRACT

In one embodiment, a method includes detecting a triggering event to initiate a communication session with a second computing device associated with a second user, where the first computing device includes one or more wireless transceivers and one or more sensors, determining an initial trust score for the second computing device, sensing physical interactions between users using the one or more sensors, adjusting the trust score for the second computing device based at least on the sensed physical interactions, and sending a message to the second computing device if the adjusted trust score for the second computing device satisfies a first threshold.

20 Claims, 8 Drawing Sheets

PROXIMITY-BASED TRUST

TECHNICAL FIELD

This disclosure generally relates to establishing digital trust based on proximity between users for digital communications.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a computing device may authorize each of the communication peers for communications based on an evaluated level of trust for the communication peer. The level of trust for a communication peer may be evaluated based at least on proximity between users of the devices. When a first user has been in proximity to a second user for longer period of time, the level of trust for the first user from a device associated with the second user may go up. The level of trust may be measured by a trust score, which is a scalar value. Though the proximity-based trust level evaluation and communication authorization can be used for any communications, the proximity-based trust level evaluation and communication authorization may be particularly useful for offline communications over wireless mesh networks, where no network infrastructure is available. When no network infrastructure is available, a computing device may not be able to authenticate and authorize a communication peer based on data from a server. When a first computing device is triggered for an offline communication session, the first computing device may discover the other computing devices in proximity using a discovery protocol. After the first computing device discovers a second computing device, the first computing device may determine an initial trust score for the second computing device and perform communications with the second computing device if the trust score for the second computing device is higher than a required threshold for the communications. The first computing device may adjust the trust score for the second computing device as the communications goes on. The first computing device may raise the trust score for the second computing device as the number of exchanged messages goes up. In particular embodiments, the first computing device may sense physical interactions between the users of the first computing device and the second computing device. The first computing device may adjust the trust score for the second computing device based on sensed physical interactions between the users. In particular embodiments, the first computing device may measure an amount of time for the user associated with the second computing device being in proximity to the user associated with the first computing device. The first computing device may adjust the trust score for the second computing device based on the amount of time for the user associated with the second computing device being in proximity to the user associated with the first computing device. As an example and not by way of limitation, a first user with a mobile phone may get on an airplane and switch the mobile phone to the airplane mode in which wireless transceivers are turned off. The first user may establish an offline messaging session with the other users on the plane by turning the Bluetooth radio on. For the offline messaging session, the mobile phone may discover the other Bluetooth enabled mobile devices and determine a trust score for each discovered mobile device. The first user may be able to send messages to a second user if a trust score for the second user's device is higher than a threshold for transmissions. The first user may be able to receive messages from the second user if the trust score for the second user's device is higher than another threshold.

In particular embodiments, a first mobile computing device associated with a first user may detect a triggering event for an offline communication session. In the offline communication session, the first mobile computing device may exchange messages with one or more mobile computing devices without routing messages through the Internet. Detecting that no network infrastructure is reachable may be the triggering event. In particular embodiments, detecting that all the communication participants for the communication session have one or more communication paths with each other without routing through the Internet may be the triggering event. The first mobile computing device may include one or more wireless transceivers and one or more sensors including a microphone, a camera, a video camera, or any suitable sensor capturing physical interactions of users. The first mobile computing device may discover a second mobile computing device associated with a second user that has one or more communication paths to the first computing device over one or more wireless networks using a wireless discovery protocol such as a Bluetooth Low Energy (BLE) discovery protocol. For the discovering the second computing device, the first mobile computing device may discover any computing device that has one or more communication paths to the first computing device over one or more wireless networks without accessing any network infrastructure. In particular embodiments, the first mobile computing device may discover only computing device that expresses interests in communicating with the first computing device on a particular topic among the computing devices that have one or more communication paths to the first computing device over one or more wireless networks without accessing any network infrastructure. The first mobile computing device may determine an initial trust score for the second computing device. For the initial trust score for the second computing device, the first mobile computing device may set the trust score to a previously used trust score for the second computing device during a previous offline communication session. In particular embodiments, the first mobile computing device may receive a trust score value for the second computing device from a third computing device. The first mobile computing device may set the trust score for the second computing device to the received trust score value if a current trust score for the third computing device satisfies a third threshold. In particular embodiments, the first mobile computing device may identify a common interest between the first computing device and the second computing device and determine the initial trust score for the second computing device based on the identified common interest. In particular embodiments, the first mobile computing device may identify the common interest based on information gathered during the discovering process. In particular embodiments, the first mobile computing device may identify the common interest based on a common application installed on both the first computing device and the second computing device. In particular embodiments, the first mobile computing device may identify the common interest based on common data stored on both the first computing device and the second computing device. The first mobile computing device may sense physical interactions between the first user and the second user using the one or more sensors. The physical interactions may include conversations, handshakes, hands waving, or any suitable human interactions that can be captured by any available sensors. The first computing device may adjust the trust score for the second computing device based at least on the sensed physical interactions between the first user and the second user. In particular embodiments, the first mobile computing device may adjust the trust score for the second computing device based further on an amount of time for the second computing device being in proximity to the first computing device. In particular embodiments, the first mobile computing device may detect a first message to be sent to the second computing device over the offline communication session. The first computing device may send the first message to the second computing device if the current trust score for the second computing device satisfies a first threshold for the message to be sent. In particular embodiments, the first mobile computing device may receive a second message from the second computing device. The second message may include an identifier of an offline communication session that the second message belongs to, an identifier of a sender, one or more identifiers that identify one or more intended receivers, and a payload. The first mobile computing device may determine that the first computing device is a part of the one or more intended receivers based on the one or more identifiers. The first mobile computing device may determine that the second computing device is the sender based on the identifier of the sender. The first mobile computing device may determine whether the current trust score for the second computing device satisfies a second threshold for the message to be received. In response to the determination, the first mobile computing device may present the payload of the second message to the first user. In particular embodiments, the first mobile computing device may receive a first security key from the second computing device. The first mobile computing device may use the first security key for decrypting messages sent by the second computing device. In particular embodiments, the first mobile computing device may issue a second security key to the second computing device. The second computing device may use the second security key for decrypting messages sent by the first computing device.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment according to the invention a, in particular computer-implemented, method comprises:

by a first computing device associated with a first user, detecting a triggering event to initiate a communication session with a second computing device associated with a second user, wherein the first computing device comprises one or more wireless transceivers and one or more sensors;

by the first computing device, determining an initial trust score for the second computing device;

by the first computing device, sensing, using the one or more sensors, physical interactions between the first user and the second user;

by the first computing device, adjusting the trust score for the second computing device based at least on the sensed physical interactions; and by the first computing device, sending a first message to the second computing device if the adjusted trust score for the second computing device satisfies a first threshold.

The first threshold may be a parameter associated with the communication session.

The first threshold may be a parameter associated with the first message.

In an embodiment according to the invention, a method may comprise:

receiving, from the second computing device, a second message comprising a payload;

determining whether the adjusted trust score for the second computing device satisfies a second threshold; and presenting, in response to the determination, the payload to the first user.

In an embodiment according to the invention, a method may comprise receiving, from the second computing device, a first security key that is to be used for decrypting messages sent by the second computing device.

In an embodiment according to the invention, a method may comprise issuing a second security key to the second computing device, wherein the second security key is used by the second computing device to decrypt messages sent by the first computing device.

The one or more sensors may comprise a microphone, a camera, a video camera, or any suitable sensor capturing physical interactions of users.

The determining the initial trust score for the second computing device may comprise setting the trust score to a previously used trust score for the second computing device during a previous communication session.

The determining the initial trust score for the second computing device may comprise:
receiving, from a third computing device, a trust score value for the second computing device; and
setting the trust score for the second computing device to the received trust score value if a current trust score for the third computing device satisfies a third threshold.

The determining the initial trust score for the second computing device may comprise:
identifying a common interest between the first computing device and the second computing device; and
determining the initial trust score for the second computing device based on the identified common interest.

The common interest may be identified based on information gathered during the discovering process.

The common interest may be identified based on a common application installed on both the first computing device and the second computing device.

The common interest may be identified based on common data stored on both the first computing device and the second computing device.

The adjusting the trust score for the second computing device may be based on an amount of time for the second computing device being in proximity to the first computing device.

The physical interactions may comprise conversations, handshakes, hands waving, or any suitable human interactions that can be captured by any available sensors.

Machine Learning (ML) techniques may be used to analyze the physical interactions.

The ML techniques may comprise natural language processing algorithms.

The ML techniques may comprise motion detection algorithms.

In an embodiment according to the invention, one or more computer-readable non-transitory storage media may embody software that may be operable when executed to cause a first computing device to:
detect a triggering event to initiate a communication session with a second computing device associated with a second user, wherein the first computing device comprises one or more wireless transceivers and one or more sensors, and wherein the first computing device is associated with a first user;
determine an initial trust score for the second computing device;
sense, using the one or more sensors, physical interactions between the first user and the second user;
adjust the trust score for the second computing device based at least on the sensed physical interactions; and
send a first message to the second computing device if the adjusted trust score for the second computing device satisfies a first threshold.

In an embodiment according to the invention, a first computing device may comprise:
one or more wireless transceivers;
one or more sensors;
one or more processors; and
one or more computer-readable non-transitory storage media coupled to one or more of the processors and comprising instructions operable when executed by one or more of the processors to cause the first computing device to:
detect a triggering event to initiate a communication session with a second computing device associated with a second user, wherein the first computing device is associated with a first user;
determine an initial trust score for the second computing device;
sense, using the one or more sensors, physical interactions between the first user and the second user;
adjust the trust score for the second computing device based at least on the sensed physical interactions; and
send a first message to the second computing device if the adjusted trust score for the second computing device satisfies a first threshold.

In an embodiment according to the invention, one or more computer-readable non-transitory storage media may embody software that is operable when executed to perform a method according to the invention or any of the above mentioned embodiments.

In an embodiment according to the invention, a system may comprise: one or more processors; and at least one memory coupled to the processors and comprising instructions executable by the processors, the processors operable when executing the instructions to perform a method according to the invention or any of the above mentioned embodiments.

In an embodiment according to the invention, a computer program product, preferably comprising a computer-readable non-transitory storage media, may be operable when executed on a data processing system to perform a method according to the invention or any of the above mentioned embodiments.

DESCRIPTION OF EXAMPLE EMBODIMENTS

Figure 1:
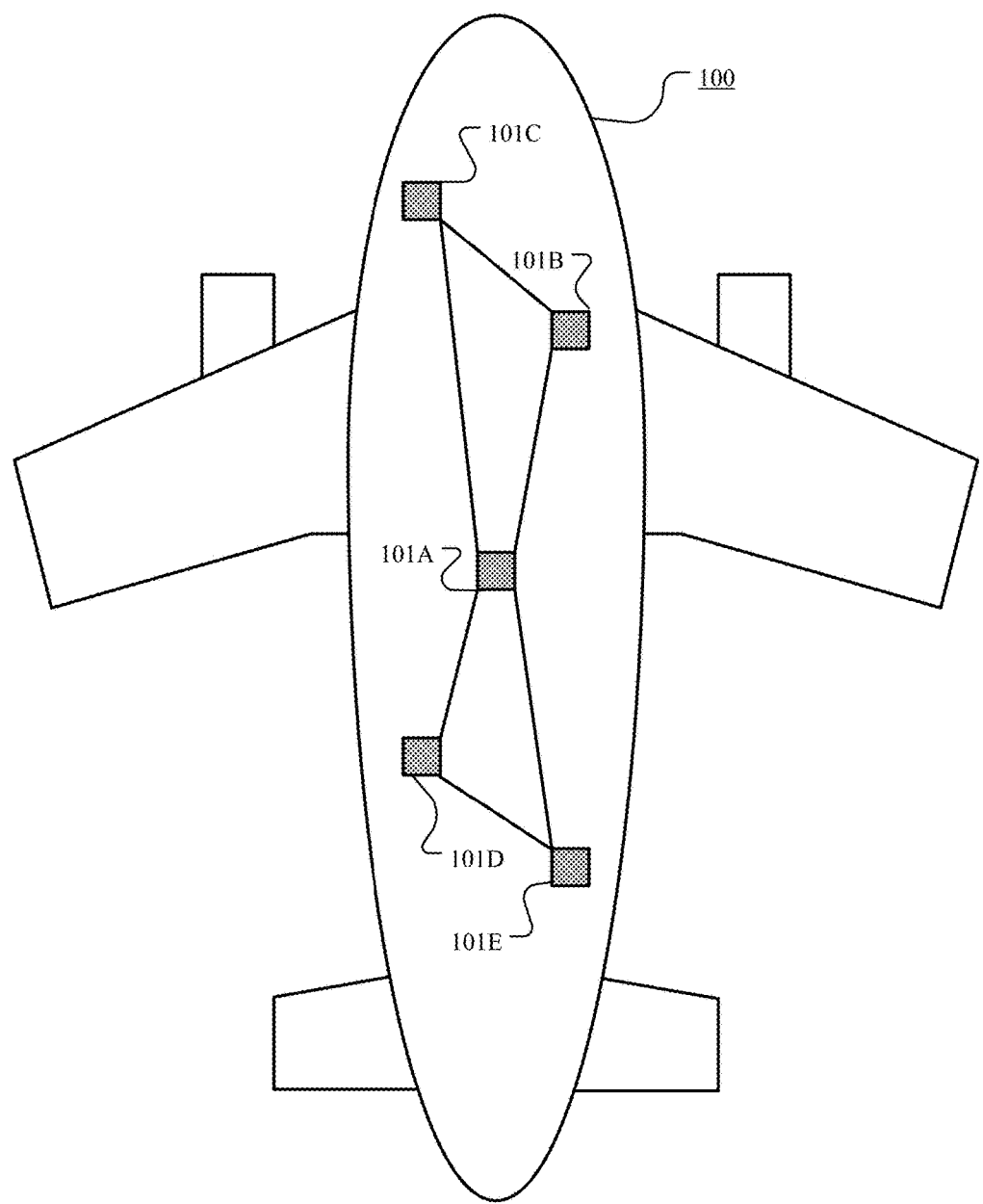
FIG. 1 illustrates an example offline wireless mesh network on an airplane.

In particular embodiments, a computing device 101A may authorize each of the communication peers for communications based on an evaluated level of trust for the communication peer. The level of trust for a communication peer may be evaluated based at least on proximity between users of the devices. When a first user has been in proximity to a second user for longer period of time, the level of trust for the first user from a device associated with the second user may go up. The level of trust may be measured by a trust score, a scalar value. Though the proximity-based trust level evaluation and communication authorization can be used for any communications, the proximity-based trust level evaluation and communication authorization may be particularly useful for offline communications over wireless mesh networks, where no network infrastructure is available. When no network infrastructure is available, a computing device 101A may not be able to authenticate and authorize a communication peer based on data from a server. When a first computing device 101A is triggered to initiate an offline communication session, the first computing device 101A may discover the other computing devices in proximity using a discovery protocol. After the first computing device 101A discovers a second computing device 101B, the first computing device 101A may determine an initial trust score for the second computing device 101B and perform communications with the second computing device 101B if the trust score for the second computing device 101B is higher than a required threshold for the communications. The required threshold for the communications may be a parameter associated with the offline communication session. In particular embodiments, the required threshold for the communications may be a parameter associate with each message. The first computing device 101A may adjust the trust score for the second computing device 101B as the communications goes on. The first computing device may raise the trust score for the second computing device 101B as the number of exchanged messages goes up. In particular embodiments, the first computing device 101A may sense physical interactions between the users of the first computing device 101A and the second computing device 101B. The first computing device 101A may adjust the trust score for the second computing device 101B based on sensed physical interactions between the users. In particular embodiments, the first computing device 101A may measure an amount of time for the user associated with the second computing device 101B being in proximity to the user associated with the first computing device 101A. The first computing device 101A may adjust the trust score for the second computing device 101B based on the amount of time for the user associated with the second computing device 101B being in proximity to the user associated with the first computing device 101A. As an example and not by way of limitation, a first user with a mobile phone may get on an airplane and switch the mobile phone to the airplane mode in which wireless transceivers are turned off. The first user may establish an offline messaging session with the other users on the plane by turning the Bluetooth radio on. For the offline messaging session, the mobile phone may discover the other Bluetooth enabled mobile devices and determine a trust score for each discovered mobile device. The first user may be able to send messages to a second user if a trust score for the second user's device is higher than a threshold for transmissions. The first user may be able to receive messages from the second user if the trust score for the second user's device is higher than another threshold. Although this disclosure describes authenticating communications based on the proximity-based trust level in a particular manner, this disclosure contemplates authenticating communications based on the proximity-based trust level in any suitable manner.

In particular embodiments, a first mobile computing device associated with a first user may detect a triggering event for an offline communication session. In the offline communication session, the first mobile computing device may exchange messages with one or more mobile computing devices without routing the messages through a network infrastructure. Detecting that no network infrastructure is reachable may be the triggering event. In particular embodiments, detecting that all the communication participants for the communication session have one or more communication paths with each other over one or more wireless networks without accessing any network infrastructure may be the triggering event. The first mobile computing device may include one or more wireless transceivers and one or more sensors including a microphone, a camera, a video camera, or any suitable sensor capturing physical interactions of users. The first mobile computing device may discover a second mobile computing device associated with a second user that has one or more communication paths to the first computing device 101A over one or more wireless networks using a wireless discovery protocol such as a Bluetooth Low Energy (BLE) discovery protocol. For discovering the second computing device 101B, the first mobile computing device may discover any computing device that has one or more communication paths to the first computing device 101A over one or more wireless networks without accessing any network infrastructure. In particular embodiments, the first mobile computing device may discover only computing devices that express interest in communicating with the first computing device 101A on a particular topic among the computing devices that have one or more communication paths to the first computing device 101A over one or more wireless networks without accessing any network infrastructure. The first mobile computing device may determine an initial trust score for the second computing device 101B. For the initial trust score for the second computing device 101B, the first mobile computing device may set the trust score to a previously used trust score for the second computing device 101B during a previous offline communication session. In particular embodiments, the first mobile computing device may receive a trust score value for the second computing device 101B from a third computing device. The first mobile computing device may set the trust score for the second computing device 101B to the received trust score value if a current trust score for the third computing device satisfies a third threshold. In particular embodiments, the first mobile computing device may identify a common interest between the first computing device 101A and the second computing device 101B and determine the initial trust score for the second computing device 101B based on the identified common interest. In particular embodiments, the first mobile computing device may identify the common interest based on information gathered during the discovering process. In particular embodiments, the first mobile computing device may identify the common interest based on a common application installed on both the first computing device 101A and the second computing device 101B. In particular embodiments, the first mobile computing device may identify the common interest based on common data stored on both the first computing device 101A and the second computing device 101B. The first mobile computing device may sense physical interactions between the first user and the second user using the one or more sensors. The physical interactions may include conversations, handshakes, hands waving, or any suitable human interactions that can be captured by any available sensors. The first computing device 101A may adjust the trust score for the second computing device 101B based at least on the sensed physical interactions between the first user and the second user. In particular embodiments, the first mobile computing device may adjust the trust score for the second computing device 101B based further on an amount of time for the second computing device 101B being in proximity to the first computing device 101A. In particular embodiments, the first mobile computing device may detect a first message to be sent to the second computing device 101B over the offline communication session. The first computing device 101A may send the first message to the second computing device 101B if the current trust score for the second computing device 101B satisfies a first threshold for the message to be sent. In particular embodiments, the first mobile computing device may receive a second message from the second computing device 101B. The second message may include an identifier of an offline communication session that the second message belongs to, an identifier of a sender, one or more identifiers that identify one or more intended receivers, and a payload. The first mobile computing device may determine that the first computing device 101A is a part of the one or more intended receivers based on the one or more identifiers. The first mobile computing device may determine that the second computing device 101B is the sender based on the identifier of the sender. The first mobile computing device may determine whether the current trust score for the second computing device 101B satisfies a second threshold for the message to be received. In response to the determination, the first mobile computing device may present the payload of the second message to the first user. In particular embodiments, the first mobile computing device may receive a first security key from the second computing device 101B. The first mobile computing device may use the first security key for decrypting messages sent by the second computing device 101B. In particular embodiments, the first mobile computing device may issue a second security key to the second computing device 101B. The second computing device 101B may use the second security key for decrypting messages sent by the first computing device 101A.

In particular embodiments, a first computing device 101A associated with a first user may detect a triggering event to initiate a communication session. In particular embodiments, the communication session may be an offline communication session where the first computing device 101A may exchange messages with one or more computing devices without routing through the Internet. The triggering event may be an instruction from the user. In particular embodiments, the first computing device 101A may detect that no network infrastructure is reachable. The detection may be a triggering event to initiate an offline communication session. In particular embodiments, the first computing device 101A may detect that all the communication participants for the communication session have one or more communication paths with each other without routing through the Internet. The detection may be a triggering event for an offline communication session. FIG. 1 illustrates an example offline wireless mesh network on an airplane. As an example and not by way of limitation, illustrated in FIG. 1, a first user associated with the first computing device 101A may get on an airplane 100 and switch the first computing device 101A to an airplane mode in which wireless transceivers of the first computing device 101A are turned off. The first user may want to establish an offline messaging session with the other users on the plane to chat about football games during the flight. The first user may turn on a Bluetooth radio on the first computing device 101A and initiate an offline messaging session for chatting about football games. The first computing device 101A may perform a wireless discovery process by broadcasting discovery requests on a Bluetooth channel for a pre-determined period of time. At the end of the discovery process, an offline wireless mesh network comprising five mobile computing devices may be established because four computing devices 101B-101E have responded to the discovery requests. Some computing devices may not be able to communicate with each other directly. For example, as illustrated in FIG. 1, the computing device 101B may not be able to exchange messages with the computing device 101D or the computing device 101E. In such a situation, the computing device 101A may relay messages between the computing device 101B and the computing device 101D or between the computing device 101B and the computing device 101D. The computing devices 101A-101E may be the client systems 630 for an online social network. Then, the computing devices 101A-101E may utilize locally available information from the cached user profile for the online social network when the computing devices discover each other. As another example and not by way of limitation, the first computing device 101A may not be able to access any network infrastructure to access the Internet. A natural disaster situation may be an example of such a situation. The first computing device 101A may initiate an offline messaging session without input from the user. The first computing device 101A may broadcast discovery request messages to find any available communication peers. Although this disclosure describes initiating an offline communication session in a particular manner, this disclosure contemplates initiating an offline communication session in any suitable manner.

Figure 2:
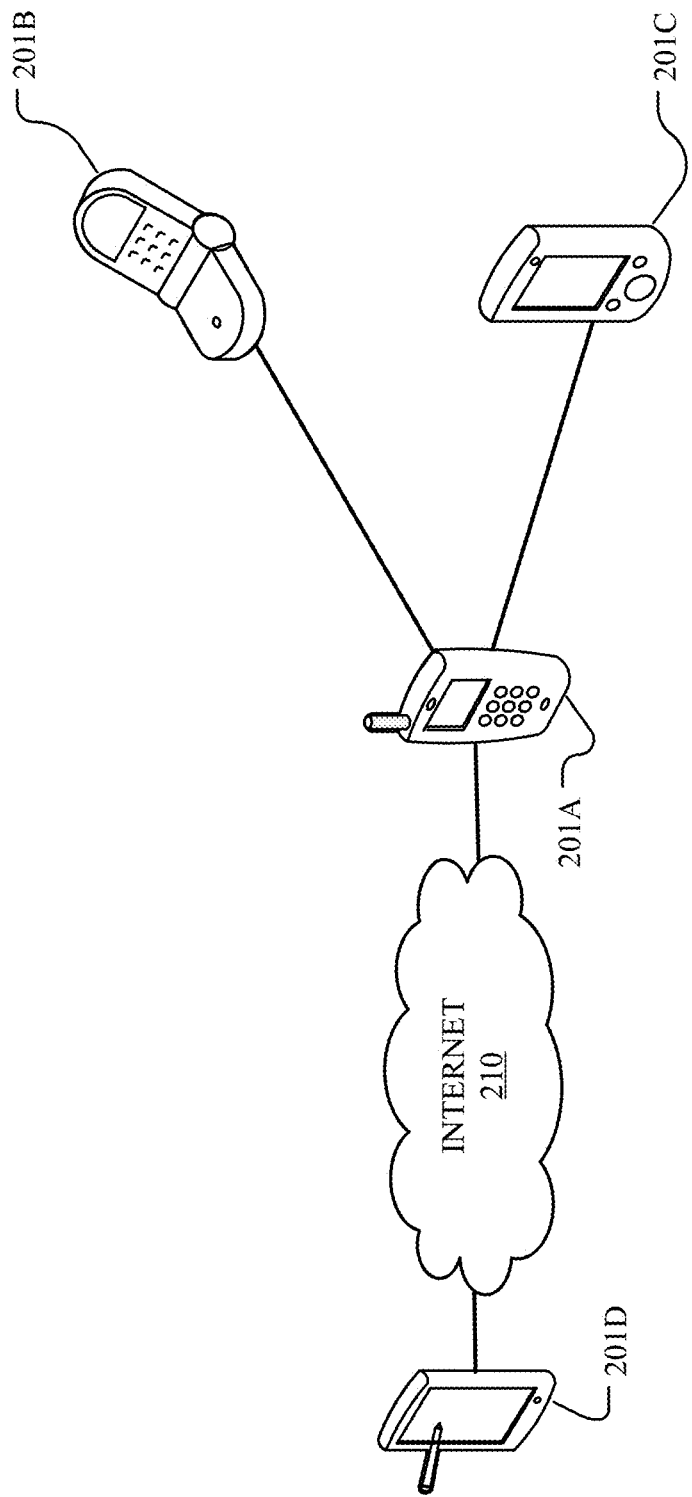
FIG. 2 illustrates an example hybrid wireless mesh network with a back-haul point.

In particular embodiments, the communication session may be a hybrid communication session where the first computing device 101A may exchange messages with one or more computing devices without routing messages through the Internet and exchange messages with one or more other computing devices by routing messages through the Internet. In particular embodiments, the first computing device 101A may detect that a majority of the participating computing devices of a communication session have one or more communication paths with each other without routing messages through the Intenet. The detection may be a triggering event to initiate a hybrid communication session. In a hybrid communication session, one or more participating computing devices may not be directly reachable locally. To communicate with those locally un-reachable computing devices, computing devices having local communication paths may route messages through one or more devices connected to the Internet. The devices connected to the Internet may be referred to as back-haul points. A back-haul point may be one of the participating computing devices. In particular embodiments, a back-haul point may be a stationary infrastructure device including a Wi-Fi access point. FIG. 2 illustrates an example hybrid wireless mesh network with a back-haul point. As an example and not by way of limitation, illustrated in FIG. 2, a first user associated with a first computing device 201A may play an online video game using the first computing device 201A. The first user may play the online video game with three of her friends. For the online video game, the computing devices associated with the players should be connected to each other. The first computing device 201A may detect that two computing devices 201B and 201C are locally reachable without routing through the Internet 210. The first computing device 201A may initiate a hybrid communication session, where the first computing device 201A communicates with the computing device 201B and 201C directly without routing messages through the Internet 210 and communicates with the computing device 201D through the Internet 210. The computing devices 201B and 201C communicate with the computing device 201D through the first computing device 201A in the example illustrated in FIG. 2. Thus, the first computing device 201A may be a back-haul point in the hybrid wireless mesh network. The computing devices 201A-201D may be the client systems 630 for an online social network. The computing devices 201A-201D may utilize data available in a data store of the social-networking system 660 when the computing devices 201A-201D initiate the communication session and maintain the communication session. As another example and not by way of limitation, the first user associated with the first computing device 201A may place an order to the first computing device 201A to initiate the hybrid communication session. Although this disclosure describes initiating a hybrid communication session in a particular manner, this disclosure contemplates initiating a hybrid communication session in any suitable manner.

In particular embodiments, the communication session may be an online communication session where the first computing device 101A may exchange messages with one or more computing devices by routing the messages through the Internet. The first computing device 101A may detect a need to communicate with one or more computing devices. The detection may be a triggering event to initiate an online communication session. Though messages are routed through the Internet, the participating computing devices and their corresponding users may be in proximity of each other. Therefore, the proximity-based trust may be utilized for authorizing the communications. As an example and not by way of limitation, illustrated in FIG. 1, the computing devices 101A-101E may access the Internet via an inflight Wi-Fi network. The computing devices 101A-101E may form an online communication session and communicate with each other through the Internet. The computing devices 101A-101E may be the client systems 630 for an online social network. Then, the computing devices 101A-101E may utilize data available in a data store of the social-networking system 660 when the computing devices 101A-101E discover each other and maintain the communication session. Although this disclosure describes initiating an online communication session in a particular manner, this disclosure contemplates initiating an online communication session in any suitable manner.

In particular embodiments, the first computing device 101A may include one or more wireless transceivers and one or more sensors including a microphone, a camera, a video camera, or any suitable sensor capturing physical interactions of users. The first computing device 101A may be capable of accessing more than one wireless network simultaneously. The first computing device 101A, during a communication session, may use more than one wireless networks for communications. The first computing device 101A may communicate with a second computing device 101B over the Bluetooth network while communicating with a third computing device 101C over the Wi-Fi network. Because the first computing device 101A is a mobile device, the first computing device 101A may have at least one wireless transceiver. Like most contemporary mobile devices, the first computing device 101A may have one or more sensors that can capture physical interactions of the users. As an example and not by way of limitation, the first computing device 101A may be a smartphone equipped with a cellular radio transceiver, a Wi-Fi radio transceiver, and a Bluetooth radio transceiver. The first computing device 101A may communicate with multiple communication peers through different wireless networks simultaneously. The first computing device 101A may also be equipped with a microphone that can sense conversations of the users and a camera that can capture both still images of the users and motions of the users. The first computing device 101A may include a physical interaction analysis module that may utilize Machine Learning (ML) techniques. In particular embodiments, the physical interaction analysis module may analyze conversations of the users using ML-based natural language processing algorithms. In particular embodiments, the physical interaction analysis module may analyze captured images of the users using ML-based image detection algorithms. In particular embodiments, the physical interaction analysis module may analyze the captured motions of the users using ML-based motion detection algorithms. The physical interaction analysis module may perform analysis standalone. In particular embodiments, the physical interaction analysis module may perform analysis by communicating with a server. Although this disclosure describes equipping one or more radio transceivers and one or more sensors in a particular manner, this disclosure contemplates equipping one or more radio transceivers and one or more sensors in any suitable manner.

In particular embodiments, the first computing device 101A may discover a second computing device 101B associated with a second user in proximity using a wireless discovery protocol such as a Bluetooth Low Energy (BLE) discovery protocol. The first computing device 101A may discover the second computing device 101B to establish an offline communication session. In particular embodiments, the first computing device 101A may discover the second computing device 101B in proximity even when establishing an online communication session. In particular embodiments, both the first computing device 101A and the second computing device 101B may be the client systems 630 of an online social network. In such a situation, the first computing device 101A may receive an indication from the social-networking system 660 that the second computing device 101B is in proximity. The indication form the social-networking system 660 may include additional information associated with the second user and the second computing device 101B. The first computing device 101A may discover any computing device in proximity. In particular embodiments, the first computing device 101A may discover only computing devices in proximity that express interests in communicating with the first computing device 101A on a particular topic. As an example and not by way of limitation, illustrated in FIG. 1, the first computing device 101A may discover computing devices in proximity using a BLE discovery protocol. The first computing device 101A may discover only computing devices expressing interests in communicating with the first computing device 101A on football games. As another example and not by way of limitation, the first computing device 101A may discover computing devices in proximity using a BLE discovery protocol because the first computing device 101A detects that the Internet is not reachable. Because this situation may be related with a disaster or an emergency situation, the first computing device 101A may discover any computing device in proximity. As yet another example and not by way of limitation, a first user associated with a first computing device 101A may enter a coffee shop. The first user may want to chat about coffee while he is waiting for his friends. The first computing device 101A may send a request to the social-networking system 660. The social-networking system 660 may send a response including a list of the online social network users in the coffee shop who are interested in coffee. The first computing device 101A may send invitations to the users identified in the response message. Although this disclosure describes discovering a communication peer in a particular manner, this disclosure contemplates discovering a communication peer in any suitable manner.

Figure 3:
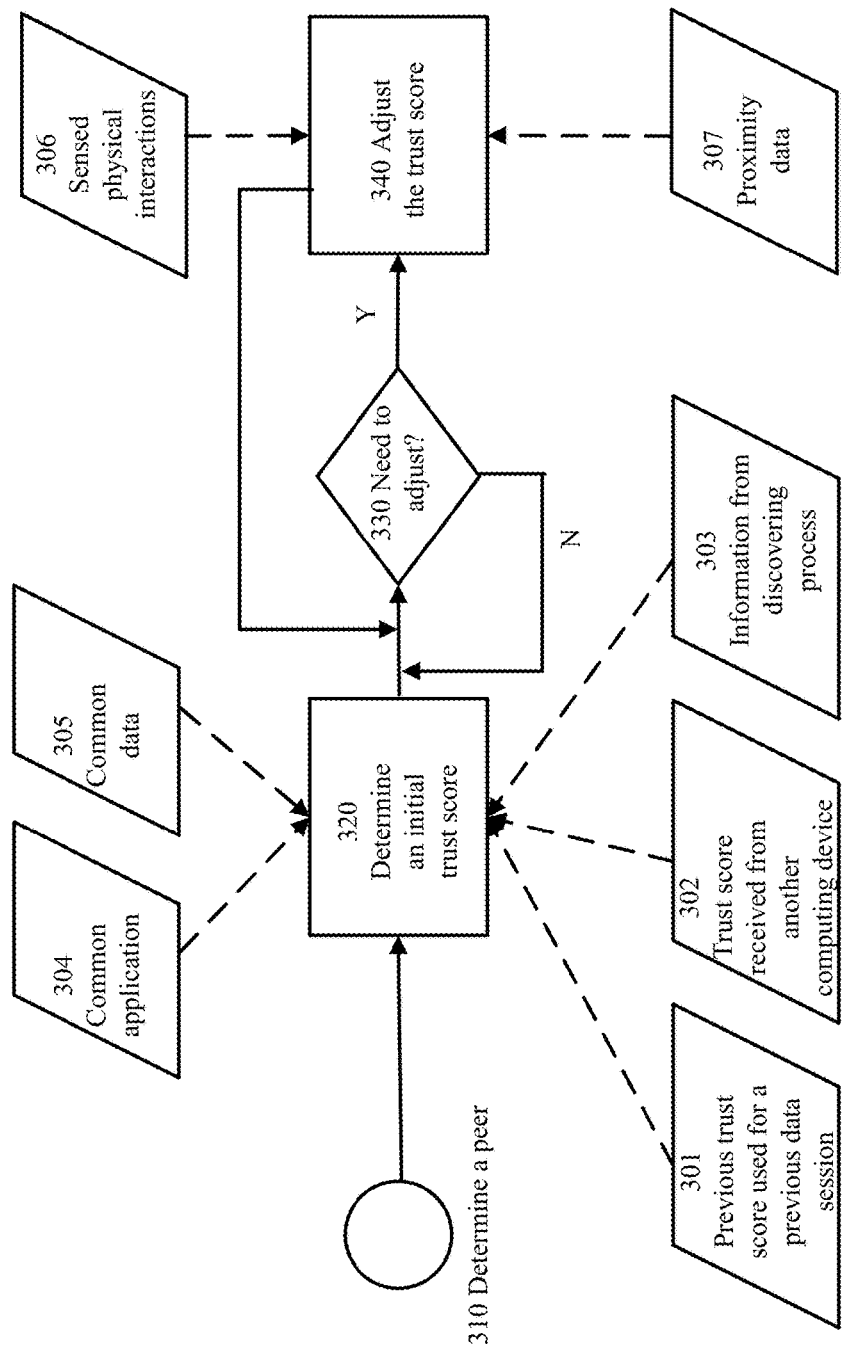
FIG. 3 illustrates an example flows for determining a trust score for a communication peer.

FIG. 3 illustrates an example flow for determining a trust score for a communication peer. In particular embodiments, the first computing device 101A may determine a second computing device 101B as a communication peer at step 310. In particular embodiments, the first computing device 101A may determine an initial trust score for the second computing device 101B at step 320. The trust score for the second computing device 101B on the first computing device 101A may indicate a degree of trustworthiness of the second computing device 101B from the first computing device 101A perspective. The first computing device 101A may send messages to the second computing device 101B only when the trust score for the second computing device 101B satisfies a threshold for the transmission. Furthermore, the first computing device 101A may drop received messages from the second computing device 101B if the trust score for the second computing device 101B does not satisfy another threshold for the reception. In particular embodiments, for the initial trust score for the second computing device 101B, the first computing device 101A may set the trust score to a previously used trust score 301 for the second computing device 101B during a previous offline communication session. After the first computing device 101A determines the second computing device 101B as a communication peer at step 310, the first computing device 101A may look up records to determine whether the second computing device 101B has ever been a communication peer. If the first computing device 101A finds a record regarding the second computing device 101B, the first computing device 101A may set the trust score to the previously used trust score 301 for the second computing device 101B. As an example and not by way of limitation, continuing with the prior example of the coffee shop, the second computing device 101B may accept the invitation from the first computing device 101A. The first computing device 101A may send a message to the social-networking system 660 requesting history messaging session records associated with the second computing device 101B. The social-networking system 660 may look up records of previous messaging sessions between the first computing device 101A and the second computing device 101B. The social-networking system 660 may send a response message to the first computing device 101A including a list of previous messaging sessions between the first computing device 101A and the second computing device 101B. The list may comprise details of each messaging session including the trust score for the second computing device 101B. If the first computing device 101A receives a response with any previous messaging session records, the first computing device 101A may set the trust score for the second computing device 101B to the last used trust score 301. In particular embodiments, the first computing device 101A may ignore the records in the response message if the last message session occurred earlier than a threshold. As another example and not by way of limitation, continuing with the prior example of the airplane, the first computing device 101A may discover a second computing device 101B using a BLE discovery protocol. After identifying the second computing device, the first computing device 101A may look up the identifier of the second computing device 101B on the records of the previous offline communication sessions from the local memory. If the first computing device 101A finds a record about an offline communication session in which the second computing device 101B participated, the first computing device 101A may set the trust score to the previously used trust score 301. In particular embodiments, the first computing device 101A may ignore the record if the record is older than a threshold. Although this disclosure describes determining an initial trust score for a communication peer based on a previously used trust score for the communication peer in a particular manner, this disclosure contemplates determining an initial trust score for a communication peer based on a previously used trust score for the communication peer in any suitable manner.

In particular embodiments, the first computing device 101A may receive a trust score value for the second computing device 101B from a third computing device 101C. The first computing device 101A may set the trust score for the second computing device 101B to the received trust score value 302 if a trust score for the third computing device satisfies a threshold. As an example and not by way of limitation, continuing with the prior example of the airplane, the first user associated with the first computing device 101A may be a friend of a third user associated with the third computing device 101C. The second user associated with the second computing device is a colleague of the third user. When the first computing device 101A discovers the second computing device 101B, the first computing device 101A may not have any previous record associated with the second computing device, but the first computing device 101A may have a record associated with the third computing device 101C because the third user is a friend of the first user. The third computing device 101C may have records associated with both the first computing device 101A and the second computing device 101B. The first computing device 101A may receive a trust score for the second computing device 101B from the third computing device 101C. The trust score for the third computing device 101C on the first computing device 101A may be determined based on a record of a previous offline messaging session, and may be higher than a threshold. The first computing device may set the trust score for the second computing device 101B to the trust score 302 received from the third computing device because the trust score for the third computing device 101C is higher than a threshold. Although this disclosure describes determining an initial trust score for a communication peer based on information received from a trustworthy third-party peer in a particular manner, this disclosure contemplates determining an initial trust score for a communication peer based on information received from a trustworthy third-party peer in any suitable manner.

In particular embodiments, the first computing device 101A may identify a common interest between the first computing device 101A and the second computing device 101B and determine the initial trust score for the second computing device 101B based on the identified common interest. In particular embodiments, the first computing device 101A may identify the common interest based on information gathered during the discovering process 303. As an example and not by way of limitation, continuing with the prior example of the airplane, the first computing device 101A may perform a discovery process for an offline messaging session to chat about football games. The first computing device 101A may consider that the computing devices that responded to the discovery requests are interested in talking about football games. The first computing device 101A may set the trust score for the responded computing devices to a pre-determined value. The pre-determined value may be a value that allows the first computing device 101A to exchange messages about football games with the responded computing devices. As another example and not by way of limitation, continuing with the prior example of the coffee shop, the first computing device 101A may receive a list of computing devices in the coffee shop that are associated with users who are interested in coffee from the social-networking system 660. The first computing device may set the trust scores for the computing devices in the list to a pre-determined value. The pre-determined value may be a value that allows the first computing device 101A to exchange messages with the computing devices in the list about coffee. In particular embodiments, the first computing device 101A may identify the common interest based on a common application 304 installed on both the first computing device 101A and the second computing device 101B. As an example and not by way of limitation, an application for an upcoming event may be installed on both a first computing device 101A and a second computing device 101B. The installed application on both computing devices may indicate that the users of the computing devices are interested in attending the event. When the first computing device 101A finds out that the second computing device 101B has the common application installed, the first computing device 101A may set the trust score for the second computing device to a pre-determined value. The pre-determined value may be a value that allows the first computing device 101A to exchange messages with the second computing device 101B about the event. In particular embodiments, the first computing device 101A may identify the common interest based on common data 305 stored on both the first computing device 101A and the second computing device 101B. As an example and not by way of limitation, a common calendar item for an upcoming event may be on both a first computing device 101A and a second computing device 101B. The common calendar item for the event on both devices may indicate that the users of both devices are interested in attending the event. When the first computing device 101A finds out that the second computing device 101B has the common calendar item, the first computing device 101A may set the trust score for the second computing device to a pre-determined value. The pre-determined value may be a value that allows the first computing device 101A to exchange messages with the second computing device 101B about the event. Although this disclosure describes determining an initial trust score for a communication peer based on a common interest in a particular manner, this disclosure contemplates determining an initial trust score for a communication peer based on a common interest in any suitable manner.

In particular embodiments, the first computing device 101A may sense physical interactions between the first user and the second user using the one or more sensors, where the first user is associated with the first computing device 101A and the second user is associated with the second computing device 101B. The physical interactions may include conversations, handshakes, hands waving, or any suitable human interactions that can be captured by any available sensors. As an example and not by way of limitation, a first computing device 101A may be equipped with a microphone. A first user associated with the first computing device 101A and a second user associated with a second computing device 101B may be in proximity with each other. When the first computing device 101A and the second computing device 101B initiate a communication session, the first computing device 101A may sense conversations between the first user and the second user using the equipped microphone. To analyze the conversations, the first computing device 101A may utilize ML-based natural language processing algorithms. As another example and not by way of limitation, continuing with the prior example, the first computing device may also be equipped with a motion capturing camera. While the communication session between the first computing device 101A and the second computing device 101B lasts, the first computing device 101A may sense physical interactions between the first user and the second user using the camera. The physical interactions may include handshakes, hugs, hands waving, or any suitable physical interactions. The first computing device 101A may utilize ML-based motion detection algorithms to analyze the interactions. Although this disclosure describes sensing physical interactions between users in a particular manner, this disclosure contemplates sensing physical interactions between users in any suitable manner.

In particular embodiments, the first computing device 101A may adjust the trust score for the second computing device 101B based at least on the sensed physical interactions 306 between the first user and the second user. Throughout the communication session, the first computing device 101A may keep checking whether adjusting the trust score for the second computing device 101B is needed at step 330. When an adjustment is needed, the first computing device 101A may adjust the trust score for the second computing device 101B accordingly at step 340. As an example and not by way of limitation, continuing with the prior example of microphone, the first computing device 101A may sense that the conversation between the first user and the second user last longer than a threshold. The first computing device 101A may raise the trust score for the second computing device 101B because a conversation longer than the threshold may indicate that the first user and the second user may establish trust. The threshold may be dependent of the current trust score value. If the current trust score is high, the threshold may be long. As another example and not by way of limitation, the fist computing device 101A may adjust the trust score for the second computing device 101B based on contexts of the conversation. The conversation may be analyzed using ML-based natural language processing. As yet another example and not by way of limitation, continuing with the prior example of motion capturing camera, the first computing device 101A may detect that the first user and the second user shake hands. The first computing device 101A may raise the trust score for the second computing device 101B because the handshake may indicate that the users have established trust. The first computing device 101A may utilize ML-based motion detection algorithms to analyze the captured motions. The first computing device 101A may analyze physical interactions in a standalone mode. In particular embodiments, the first computing device 101A may analyze physical interactions by communicating with a server. Although this disclosure describes adjusting the trust score for a communication peer based on sensed physical interactions between users in a particular manner, this disclosure contemplates adjusting the trust score for a communication peer based on sensed physical interactions between users in any suitable manner.

In particular embodiments, the first computing device 101A may adjust the trust score for the second computing device 101B based on an amount of time for the second computing device 101B being in proximity to the first computing device 101A. The users may have a chance to build trust while the users are in proximity to each other. Therefore, when the users have more time in proximity to each other, a higher trust score may result. As an example and not by way of limitation, the first computing device 101A may detect that the second computing device 101B has been in proximity for longer than a threshold. The threshold may be dependent on the current trust score for the second computing device 101B. The first computing device may determine that the trust score for the second computing device 101B needs to be adjusted at step 330. The first computing device may raise the trust score for the second computing device 101B based on the proximity data 307 at step 340. As another example and not by way of limitation, the first computing device 101A may detect that the second computing device 101B has not been in proximity for longer than another threshold. The threshold may be dependent on the current trust score for the second computing device 101B. The first computing device may determine that the trust score for the second computing device 101B needs to be adjusted at step 330. The first computing device may lower the trust score for the second computing device 101B based on the proximity data 307 at step 340. Although this disclosure describes adjusting the trust score for a communication peer based on proximity data in a particular manner, this disclosure contemplates adjusting the trust score for a communication peer based on proximity data in any suitable manner.

Figure 4:
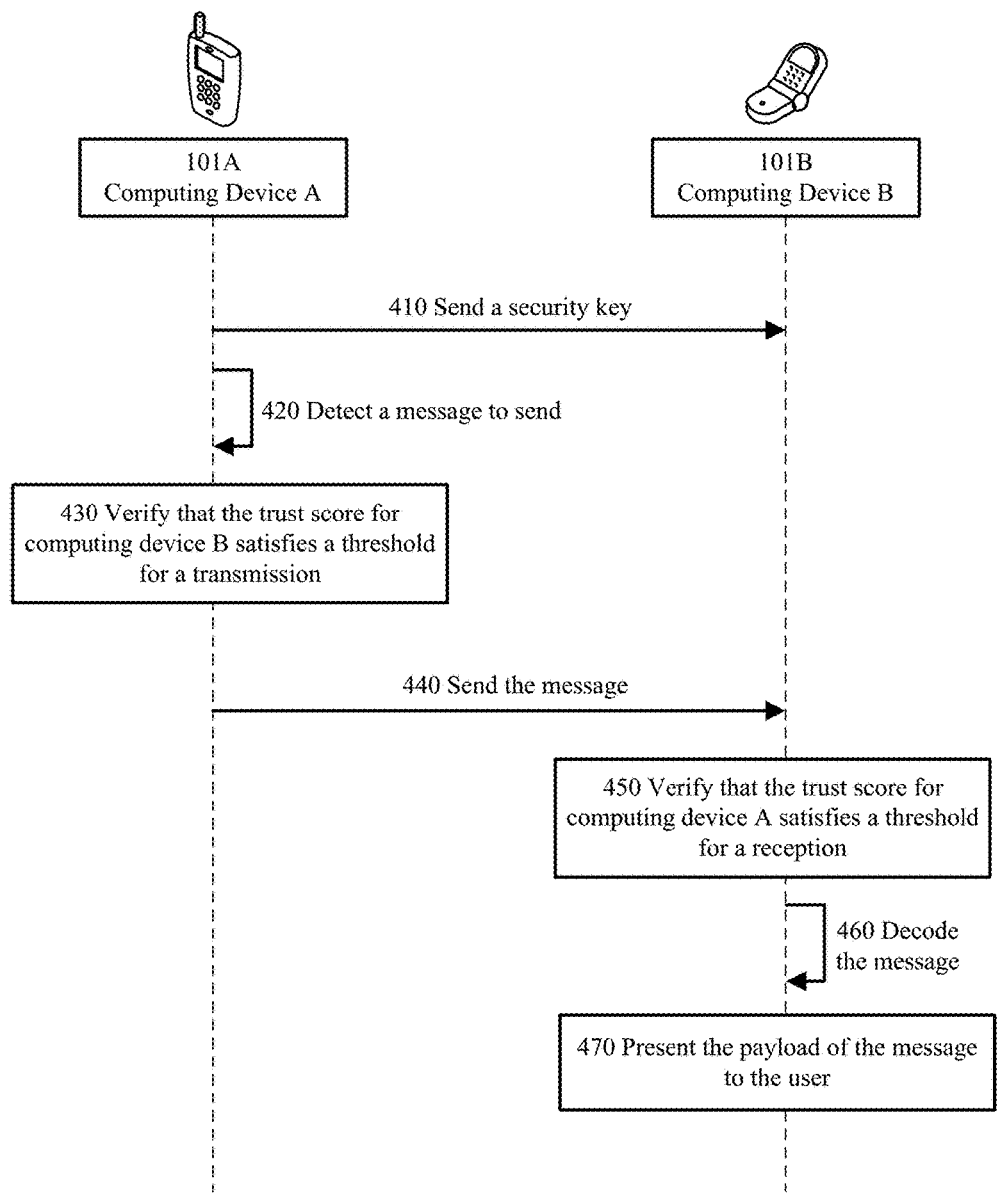
FIG. 4 illustrates an example message delivery with authorization based on a trust score.

FIG. 4 illustrates an example message delivery with authorization based on a trust score. In particular embodiments, the first computing device 101A may issue a security key to the second computing device 101B at step 410. The second computing device 101B may use the security key for decrypting messages sent by the first computing device 101A. In particular embodiments, the security key may have a hierarchical structure such that a higher level security key may decrypt a message encrypted with a lower level security key, but a lower level security key may not decrypt a message encrypted with a higher level security key. The security key issued to the second computing device 101B may be dependent on the current trust score for the second computing device 101B. By issuing the security key based on the trust score for the second computing device 101B, the first computing device 101A may make sure that the second computing device 101B is not able to decrypt a message if the message is encrypted by a higher level security key. As an example and not by way of limitation, a first computing device 101A may initiate a communication session with a second computing device 101B. After determining an initial trust score for the second computing device 101B, the first computing device 101A may issue a security key to the second computing device 101B at step 410. Although this disclosure describes issuing a security key for upcoming communications in a particular manner, this disclosure contemplates issuing a security key for upcoming communications in any suitable manner.

In particular embodiments, the first computing device 101A may detect a message to be sent to the second computing device 101B at step 420. The message may comprise one or more identifiers identifying one or more intended receivers of the message, an identifier of the sender, and a payload. The first computing device may determine that the message is destined for the second computing device based on the one or more identifiers. In particular embodiments, one of the one or more identifiers may be an identifier of a group to that the second computing device 101B belongs. The first computing device 101A may verify that the current trust score for the second computing device satisfies a threshold for the message to be transmitted at step 430. A communication session may be associated with a minimum required trust score to be eligible receivers. In such a situation, the minimum required trust score associated with the communication session may be the threshold. In particular embodiments, each message may be associated with a minimum required trust score to be eligible receivers. The message may further comprise a minimum required trust score that the receivers need to have. In such a situation, the minimum required trust score to be eligible receivers associated with the message may be the threshold. The first computing device 101A may send the first message to the second computing device 101B at step 440 if the current trust score for the second computing device 101B satisfies the threshold. As an example and not by way of limitation, continuing with the prior example of the airplane, the first computing device 101A may establish an offline communication session for chatting about football games. Because the purpose of the communication session is just chatting on a casual subject, the communication session may be associated with a low minimum required trust score to be eligible receivers. The initial trust scores for all the participating computing devices on the first computing device may satisfy the minimum required trust score to be eligible receivers associated with the communication session. The first computing device 101A may send messages to the second computing device 101B as the trust score for the second computing device 101B satisfies the threshold. As another example and not by way of limitation, a first computing device 101A associated with a first user may initiate with a second computing device 101B associated with a second user, a colleague of the first user. The users may exchange messages regarding a classified project. Each message may be associated with a required minimum trust score to be eligible receivers. Because the first user and the second user work together often, the mutual trust scores based on proximity may satisfy the minimum required trust score to be eligible receivers associated with the messages. When the first computing device 101A sends an attachment on a message, the minimum required trust score to be eligible receivers associated with the message may be higher than that of the other messages. Although this disclosure describes authorizing a transmission based on the trust score of the receiver in a particular manner, this disclosure contemplates authorizing a transmission based on the trust score of the receiver in any suitable manner.

In particular embodiments, the second computing device 101B may receive a message from the first computing device 101A at step 450. The second computing device 101B may determine that the second computing device 101B is a part of the one or more intended receivers based on the one or more identifiers of the receivers on the message. The second computing device 101B may determine that the first computing device 101A is the sender based on the identifier of the sender from the message. The first computing device 101A may determine whether the current trust score for the first computing device 101A satisfies a threshold for the message to be received at step 450. In response to the determination, the second computing device 101B may decode the message at step 460 using the security key received at step 410. The second computing device 101B may present the payload of the message to the second user at step 470. A communication session may be associated with a minimum required trust score to be an eligible sender. In such a situation, the minimum required trust score to be an eligible sender associated with the communication session may be the threshold. In particular embodiments, each message may be associated with a minimum required trust score to be an eligible sender. The message may further comprise a minimum required trust score to be an eligible sender. In such a situation, the minimum required trust score to be an eligible sender associated with the message may be the threshold. Although this disclosure describes authorizing a reception based on the trust score of the sender in a particular manner, this disclosure contemplates authorizing a reception based on the trust score of the sender in any suitable manner.

Figure 5:
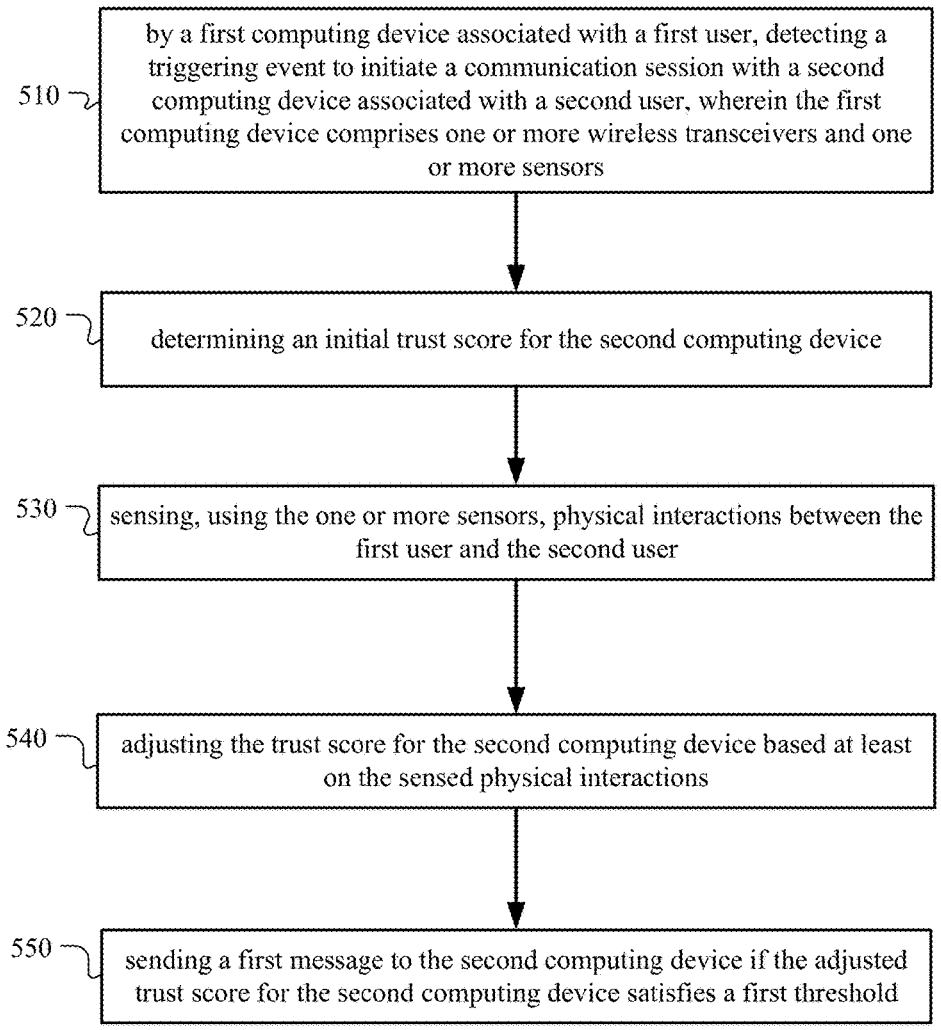
FIG. 5 illustrates an example method for sending a message based on a trust score.

FIG. 5 illustrates an example method 500 for sending a message based on a trust score. The method may begin at step 510, where a first computing device associated with a first user detects a triggering event to initiate a communication session with a second computing device associated with a second user, wherein the first computing device comprises one or more wireless transceivers and one or more sensors. At step 520, the first computing device determines an initial trust score for the second computing device. At step 530, the first computing device senses, using the one or more sensors, physical interactions between the first user and the second user. At step 540, the first computing device adjusts the trust score for the second computing device based at least on the sensed physical interactions. At step 550, the first computing device sends a first message to the second computing device if the adjusted trust score for the second computing device satisfies a first threshold. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for sending a message based on a trust score including the particular steps of the method of FIG. 5, this disclosure contemplates any suitable method for sending a message based on a trust score including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

System Overview

Figure 6:
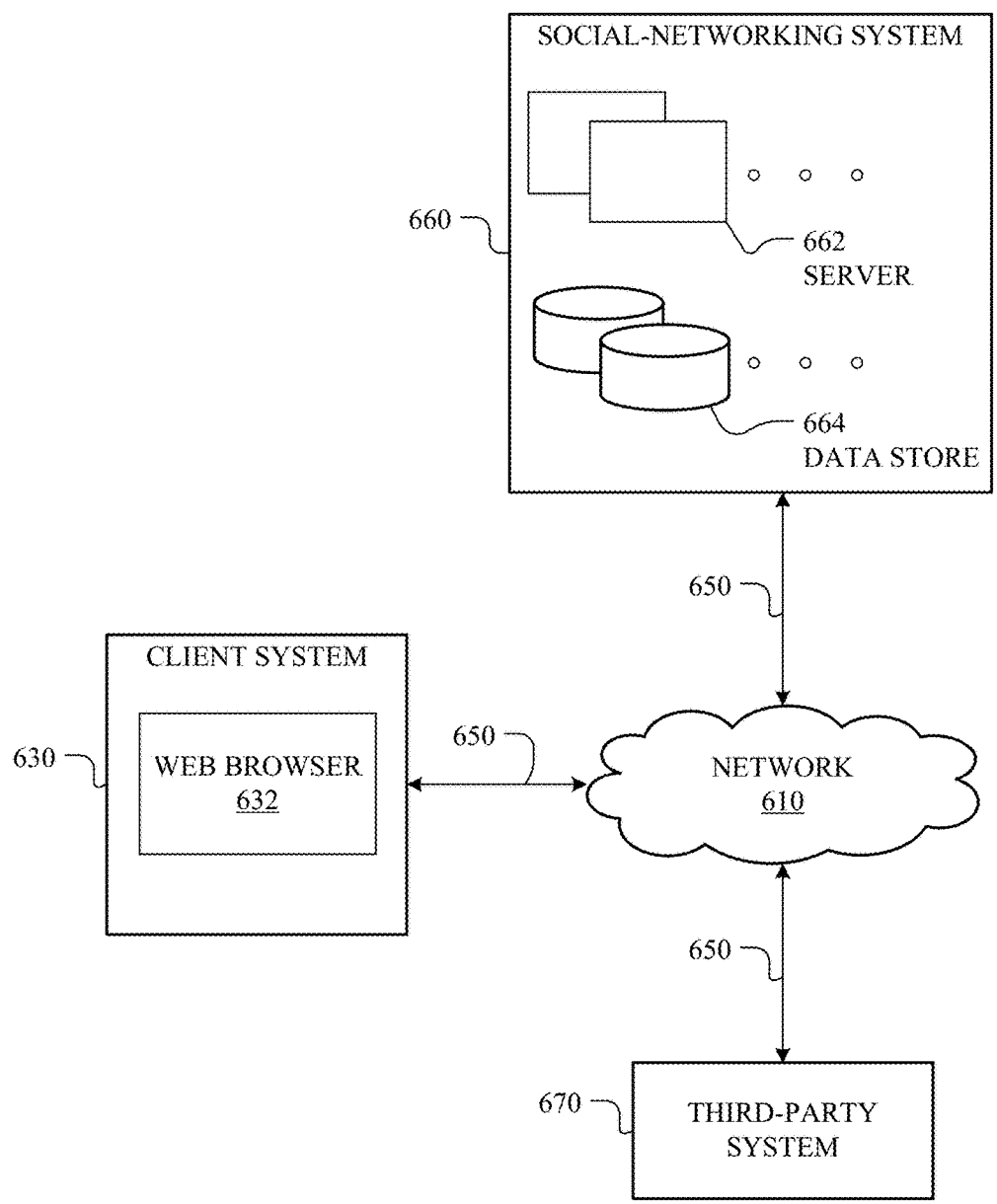
FIG. 6 illustrates an example network environment associated with a social-networking system.

FIG. 6 illustrates an example network environment 600 associated with a social-networking system. Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Social Graphs

Figure 7:
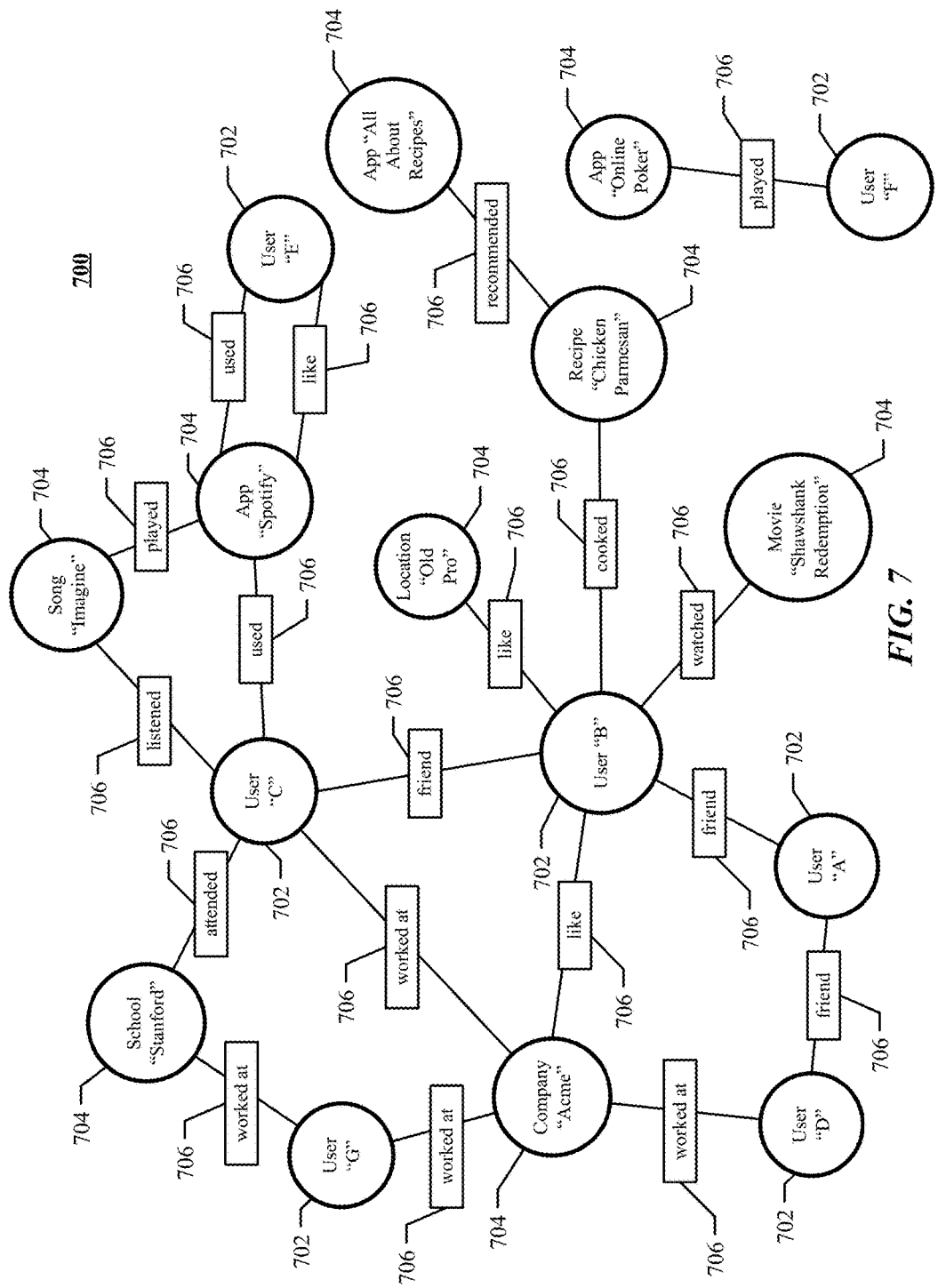
FIG. 7 illustrates an example social graph.

FIG. 7 illustrates example social graph 700. In particular embodiments, social-networking system 660 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular embodiments, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular embodiments, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 630 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 660 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 660 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704. In particular embodiments, social-networking system 660 may store an edge 706 in one or more data stores. In particular embodiments, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Systems and Methods

Figure 8:
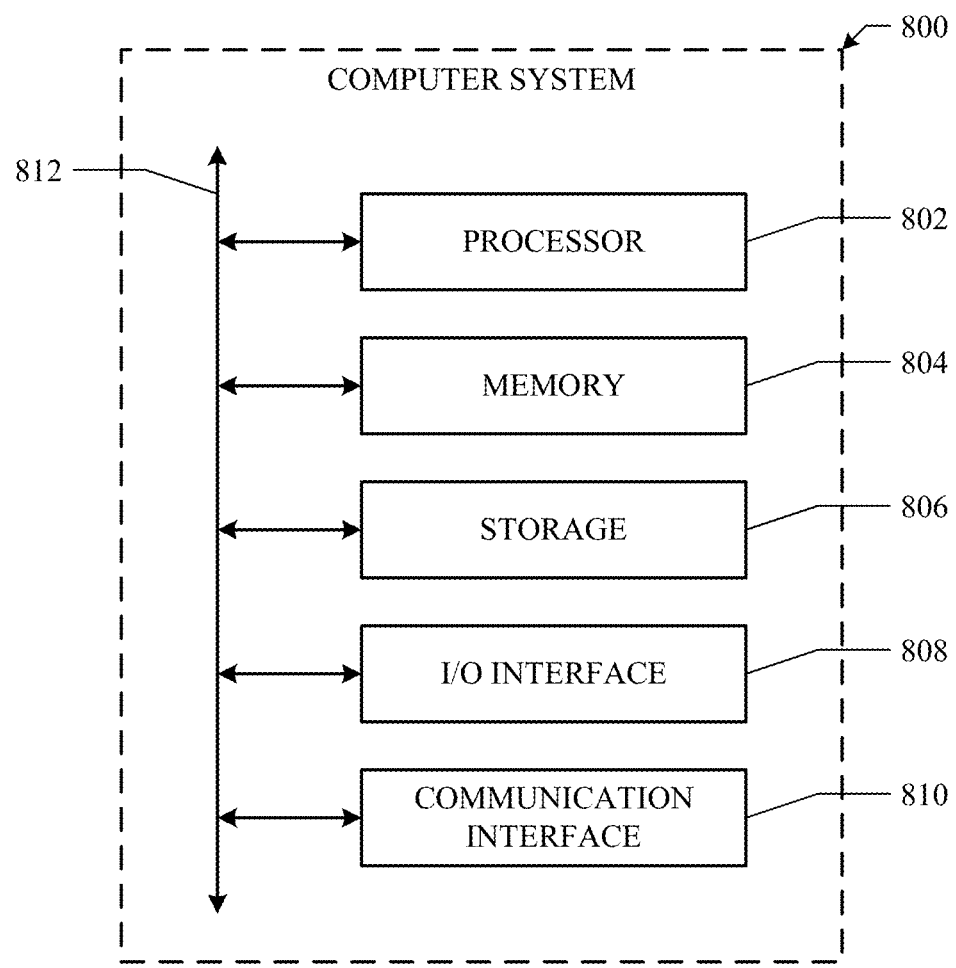
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a first computing device associated with a first user, detecting a triggering event to initiate a communication session with a second computing device associated with a second user, wherein the first computing device comprises one or more wireless transceivers and one or more sensors;
   by the first computing device, determining an initial trust score for the second computing device;
   by the first computing device, sensing, using the one or more sensors, physical interactions between the first user and the second user;
   by the first computing device, adjusting the trust score for the second computing device based at least on the sensed physical interactions; and
   by the first computing device, sending a first message to the second computing device if the adjusted trust score for the second computing device satisfies a first threshold.

2. The method of claim 1, wherein the first threshold is a parameter associated with the communication session.

3. The method of claim 1, wherein the first threshold is a parameter associated with the first message.

4. The method of claim 1, further comprising:
   receiving, from the second computing device, a second message comprising a payload;
   determining whether the adjusted trust score for the second computing device satisfies a second threshold; and
   presenting, in response to the determination, the payload to the first user.

5. The method of claim 4, further comprises receiving, from the second computing device, a first security key that is to be used for decrypting messages sent by the second computing device.

6. The method of claim 1, further comprises issuing a second security key to the second computing device, wherein the second security key is used by the second computing device to decrypt messages sent by the first computing device.

7. The method of claim 1, wherein the one or more sensors comprise a microphone, a camera, a video camera, or any suitable sensor capturing physical interactions of users.

8. The method of claim 1, wherein the determining the initial trust score for the second computing device comprises setting the trust score to a previously used trust score for the second computing device during a previous communication session.

9. The method of claim 1, wherein the determining the initial trust score for the second computing device comprises:
   receiving, from a third computing device, a trust score value for the second computing device; and
   setting the trust score for the second computing device to the received trust score value if a current trust score for the third computing device satisfies a third threshold.

10. The method of claim 1, wherein the determining the initial trust score for the second computing device comprises:
    identifying a common interest between the first computing device and the second computing device; and
    determining the initial trust score for the second computing device based on the identified common interest.

11. The method of claim 10, wherein the common interest is identified based on information gathered during the discovering process.

12. The method of claim 10, wherein the common interest is identified based on a common application installed on both the first computing device and the second computing device.

13. The method of claim 10, wherein the common interest is identified based on common data stored on both the first computing device and the second computing device.

14. The method of claim 1, wherein the adjusting the trust score for the second computing device is further based on an amount of time for the second computing device being in proximity to the first computing device.

15. The method of claim 1, wherein the physical interactions comprise conversations, handshakes, hands waving, or any suitable human interactions that can be captured by any available sensors.

16. The method of claim 15, wherein Machine Learning (ML) techniques are used to analyze the physical interactions.

17. The method of claim 16, wherein the ML techniques comprise natural language processing algorithms.

18. The method of claim 16, wherein the ML techniques comprise motion detection algorithms.

19. One or more computer-readable non-transitory storage media embodying software that is operable when executed to cause a first computing device to:
    detect a triggering event to initiate a communication session with a second computing device associated with a second user, wherein the first computing device comprises one or more wireless transceivers and one or more sensors, and wherein the first computing device is associated with a first user;

determine an initial trust score for the second computing device;

sense, using the one or more sensors, physical interactions between the first user and the second user;

adjust the trust score for the second computing device based at least on the sensed physical interactions; and send a first message to the second computing device if the adjusted trust score for the second computing device satisfies a first threshold.

20. A first computing device comprising:
one or more wireless transceivers;
one or more sensors;
one or more processors; and
one or more computer-readable non-transitory storage media coupled to one or more of the processors and comprising instructions operable when executed by one or more of the processors to cause the first computing device to:

detect a triggering event to initiate a communication session with a second computing device associated with a second user, wherein the first computing device is associated with a first user;

determine an initial trust score for the second computing device;

sense, using the one or more sensors, physical interactions between the first user and the second user;

adjust the trust score for the second computing device based at least on the sensed physical interactions; and send a first message to the second computing device if the adjusted trust score for the second computing device satisfies a first threshold.

* * * * *